United States Patent [19]

O'Brien et al.

[11] Patent Number: 4,653,255

[45] Date of Patent: Mar. 31, 1987

[54] LINE REEL MOWER

[75] Inventors: John D. O'Brien, 318 Lincoln Hwy., Rochelle, Ill. 61068; Stephen M. Baker, Woodstock; Douglas G. Davidson, Chicago, both of Ill.

[73] Assignee: John D. O'Brien, Rochelle, Ill.

[21] Appl. No.: 754,026

[22] Filed: Jul. 11, 1985
(Under 37 CFR 1.47)

Related U.S. Application Data

[63] Continuation-in-part of Ser. No. 601,861, Apr. 19, 1984, abandoned.

[51] Int. Cl.⁴ ............................................. A01D 34/53
[52] U.S. Cl. ....................................................... 56/249
[58] Field of Search ........................... 56/249, 294, 12.7

[56] References Cited

U.S. PATENT DOCUMENTS

| | | | |
|---|---|---|---|
| 2,669,083 | 2/1954 | Hinson | 56/249 |
| 2,843,808 | 8/1958 | Zifferer | 56/294 |
| 2,979,879 | 4/1961 | Reynolds | 56/294 |
| 4,232,505 | 11/1980 | Walto | 56/12.7 |

FOREIGN PATENT DOCUMENTS

| | | | |
|---|---|---|---|
| 1482015 | 3/1969 | Fed. Rep. of Germany | 56/249 |
| 2452659 | 5/1975 | Fed. Rep. of Germany | 56/249 |

*Primary Examiner*—Paul J. Hirsch

[57] ABSTRACT

A lawnmower apparatus having a plurality of elongated lines or cables fabricated from a plastic material and the like that are arranged for movement about an axis. The lines are attached to rotatable plates or discs such that the apparatus acts as a reel-type lawnmower to cut grass in conjunction with an elongated bar. A resilient assembly maintains appropriate tensioning of the lines during operation of the lawnmower.

11 Claims, 5 Drawing Figures

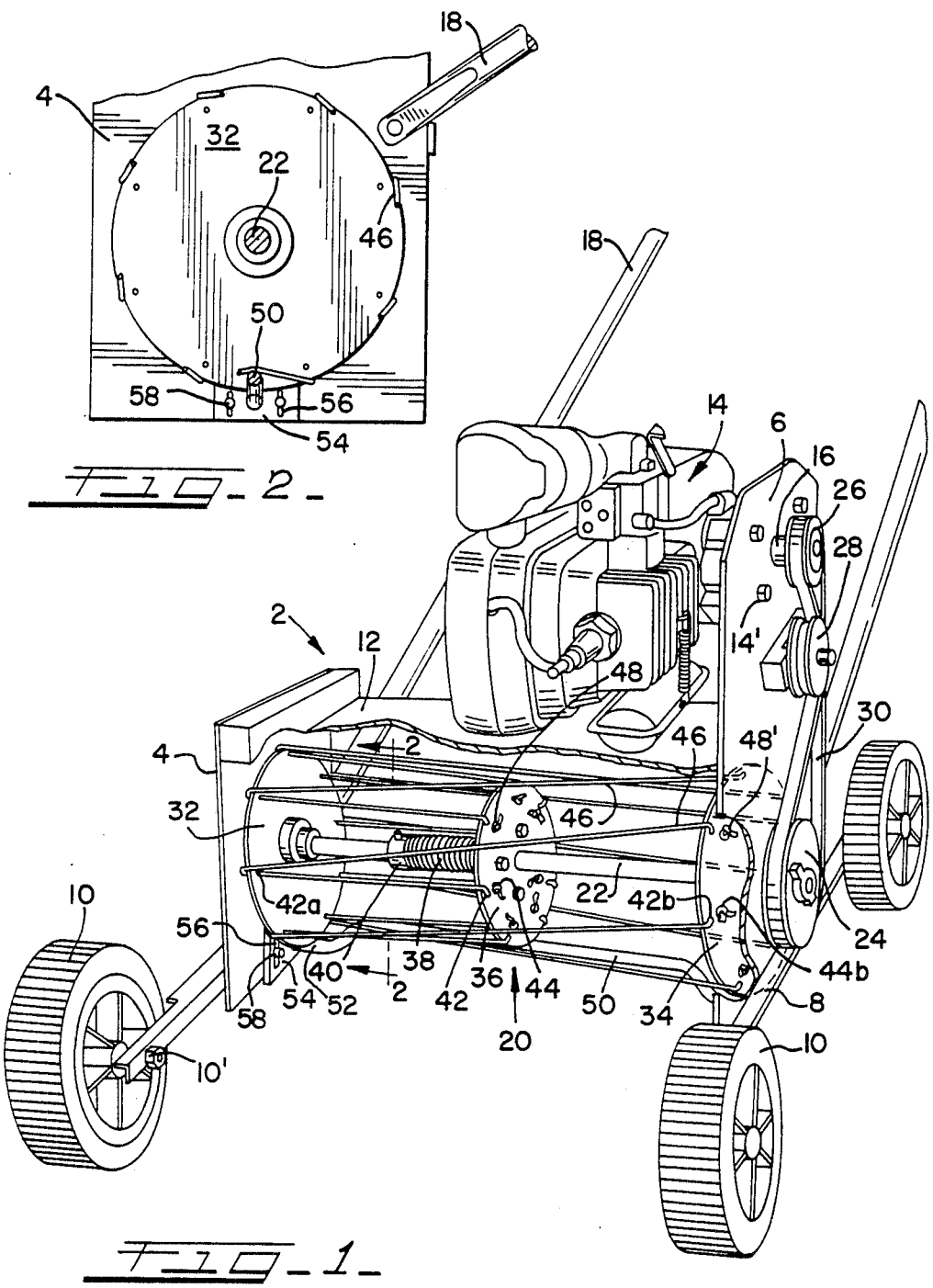

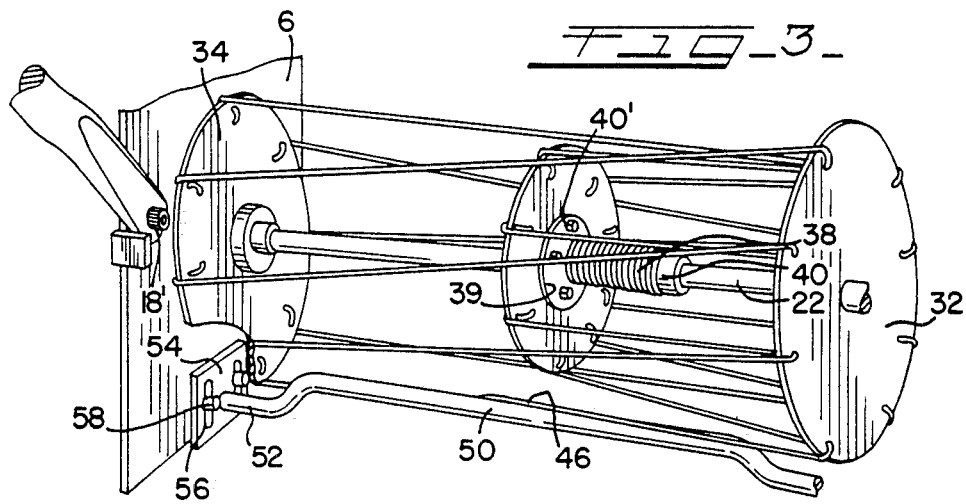
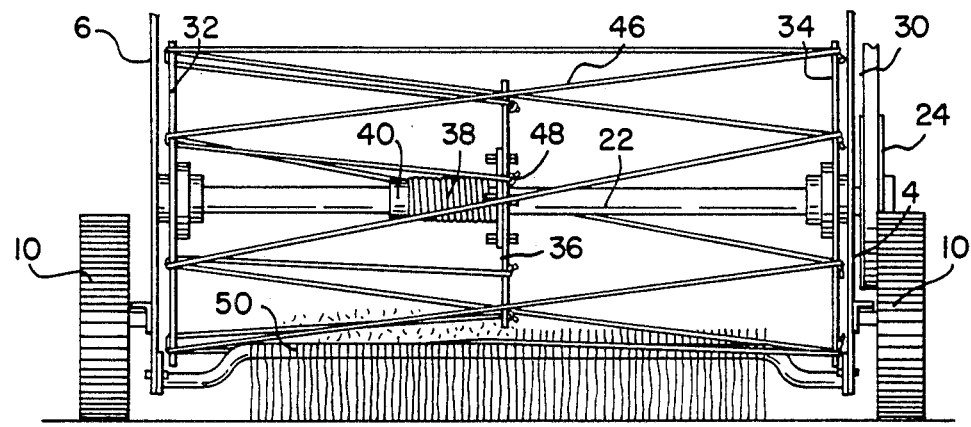
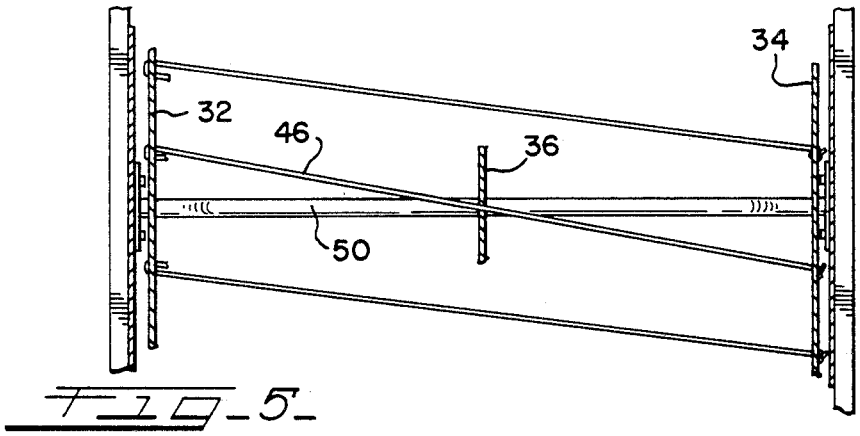

LINE REEL MOWER

This is a continuation-in-part application of co-pending application Ser. No. 601,861, filed Apr. 19, 1984 now abandoned.

BACKGROUND OF THE INVENTION

This invention relates in general to a lawnmower apparatus and, in particular, to a lawnmower apparatus employing a plurality of elongated lines as cutting elements.

More specifically, but without restriction to the particular use which is shown and described, this invention relates to a lawnmower apparatus having a plurality of elongated mono-filament lines constructed from a plastic and the like and mounted on rotatably mounted plates in a manner that the lines come in contact with a bar for cutting grass during operation. The lines forming the cutting elements are resiliently mounted to maintain tensioning and eliminate damage to the elements.

Lawnmowers have been developed along two basic designs. The first type is referred to as a rotary lawnmower in which the blade is caused to rotate about a generally vertical axis. A second popular version of lawnmowers is known as a reel mower and utilizes a plurality of blades mounted on a structure which is supported on a horizontal shaft for rotation. The blades then orbit around the horizontal axis and cooperate with a fixed member to cut the grass with a scissors-like action.

Both versions of lawnmowers have generally used metal blades. Although such metal components are effective in cutting grass in the so-called reel mower, such designs suffer from several shortcomings. Since the metal blades must constantly come in contact with a fixed metal member in such designs, the efficiency of operation is affected by the constant frictional contact between the blades of the moving reel and the fixed cutting element. This frictional contact during cutting interferes with the easy rotation of the blades and the propulsion of the mower. The presence of all metal components of a reel assembly increases the weight of the apparatus and its expense to manufacture. Rotating sharp blades also can be hazardous, particularly to the young, when propelled by a power means. Accordingly, prior reel type mowers are relatively heavy and inefficient to operate, as well as exposing the operator to moving metal blades capable of causing inJury where the device is not operated in a safe and proper manner.

SUMMARY OF THE INVENTION

It is therefore an obJect of this invention to provide an improved lawnmower.

Another obJect of this invention is to provide an economical, light weight lawnmower capable of providing safe and efficient operation.

A further obJect of this invention is to provide a reel-type lawnmower employing a plurality of elongated monofilament lines as cutting elements.

Still another object of this invention is to provide a line reel mower having a plurality of elongated elements supported on a resilient mounting.

These and other objects are attained in accordance with the present invention wherein is provided an improved lawnmower apparatus having a plurality of elongated monofilament lines mounted on support members for rotation about an axle. The elongated elements are formed from a suitable material, such as plastic and the like, and cooperate with a fixed bar for cutting and support. Distortion in the flexible plastic lines caused by bowing and/or undulations of the elements is controlled and precluded by the support action of the fixed bar to achieve a smooth, even cut without sculpturing or other unevenness. The lines of the lawnmower of the invention are resiliently mounted in a manner that proper tensioning of the elements is maintained during operation.

The line reel mower of the invention provides a lightweight, inexpensive apparatus which is highly effective in use. The principles of the invention can be applied to a self-powered unit or can be equally applied to a manual push-type lawnmower. The presence of plastic lines as cutting elements dramatically reduces the likelihood of injury to the operator, since sharp, metal cutting implements are eliminated. The line reel mower of the invention can effectively cut grass using a cutting bar having no sharp cutting surfaces.

BRIEF DESCRIPTION OF THE DRAWINGS

Further obJects of the invention and advantages accruing therefrom, will be apparent from the following description of a preferred embodiment of the invention which is shown in the accompanying drawings with like reference numerals indicating corresponding parts throughout, wherein:

FIG. 1 is a front perspective view, with portions of the handle removed, of the line reel lawnmower apparatus of the invention, FIG. 2 is an end schematic view, with parts in section, taken along lines 2—2 of FIG. 1;

FIG. 3 is a partial back view, with parts removed, of the reel lawnmower apparatus of FIG. 1;

FIG. 4 is a partial front schematic view of the line reel lawnmower apparatus of FIG. 1;

FIG. 5 is a partial top view, with parts in sect:on, of the reel cutting assembly of FIG. 4.

DESCRIPTION OF THE PREFERRED EMBODIMENT

Referring now to FIG. 1, there is illustrated the line reel lawnmower apparatus of the invention, generally designated by reference numeral 2. Although the invention of the application is described as being a powered cutting device, it is within the scope of the invention to apply the principles of the application to manual push mowers, self-propelled power mowers, or electrically driven devices. The apparatus 2 includes a pair of upright side panels 4 and 6 that are suitably affixed by any convenient technique to lower elongated frame members 8 on each side of the apparatus 2. Wheel assemblies 10 are rotatably carried as opposed pairs at the front and rear ends of the frame members 8 on respective shaft assemblies 10', as shown in FIG. 1. The side walls 4 and 6 are interconnected by a top deck 12 to form a housing upon which a conventional internal combustion engine 14 is carried. The engine is affixed to side wall 6 by means of threaded members 14'. An output shaft 16, rotatably driven by the internal combustion engine 14, extends through side panel 6 for operation of the cutting assembly of the invention, as will be apparent.

A conventional handle structure 18 is pivotally attached to the side panels 4 and 6 by means of a threaded member 18' by a mounting well known in the art and best shown in FIG. 3. A line reel cutting assembly 20 is mounted between the side panels 4 and 6 beneath upper deck 12. An axle or shaft 22 is rotatably carried on side walls 4 and 6 in a suitable bearing structure and includes a fixed lower pulley 24 disposed adjacent the outside of panel 6. An upper pulley 26 and tension pulley 28 are mounted on panel 6 above pulley 24, and a continuous belt extends around pulleys 24 and 26 and engages a portion of tension pulley 28. The output rotation of shaft 16 during operation of the internal combustion engine 14 is transmitted through the pulley system to rotate shaft 22 of the line reel assembly 20. Alternatively, the shaft 22 may be driven by other power transmission techniques, such as chains, gears and the like, other than a pulley system as shown in FIG. 1.

As shown in FIGS. 2–5, a pair of circular plates 32 and 34 are fixedly carried adjacent each end of shaft 22 in spaced relationship to panels 4 and 6. A resiliently mounted disc 36 is carried on shaft 22 by a centerless bearing (not shown) between outer plates 32 and 34. A compression spring 38 is interposed between a collar 40 affixed to shaft 22 and a plate 39 on disc 36 for resilient support of the disc 36. The resiliently mounted disc 36 includes a series of radially spaced pairs of holes 42 and 44. One of the plates 32 of the reel assembly 20 includes a single hole 42a, while the other circular plate 34 is provided with radially spaced pairs of holes 42b and 44b, similar to the holes formed through resiliently mounted disc 36.

A plurality of elongated, mono-filament lines 46 formed from a plastic and the like, are stretched under selected tension between the two outer plates 32, 34 at selected positions around the periphery of the reel assembly 20 for orbital movement about axle 22. One end of each line is affixed to resilient disc 36 and is routed through its holes 42, 44 and then around its periphery. The end portion 48 of each line 46 is knotted to restrain that end of the line in hole 44. The lines 46 then extend from the disc 36 outward through a respective hole 42a in outer plate 32 and then around its periphery. The cutting section of the mono-filament lines 46 is provided by the portion stretched across the reel assembly 20 between plate 32 and opposite plate 34. The opposite end portion of line 46 passes around the periphery of plate 34 through hole 42b and back through hole 44b, and has a knotted portion 48' (FIG. 1) to retain that end. Each pair of holes 42b, 44b, through which an individual line 46 extends, is angularly shifted about axle 22 with respect to a corresponding hole 42a to create a skewed orientation of the lines as illustrated in FIG. 5. Other forms of attachment of the ends of the lines to the plates or discs may be employed in accordance with the invention.

As best shown in FIGS. 4 and 5, the longitudinal axis of the lines is skewed with respect to the longitudinal axis of the axle 22. The resilient mounting provided by disc 36 cooperating with spring 38 maintains a desired tensioning on the plurality of lines carried by the reel assembly 20, but further provides a cushioning for the prevention of breakage of the lines 46 during operation. In the embodiment shown, cutting occurs through the movement of the mono-filament lines across a fixed, cylindrical or other shaped cutting bar 50 during rotation of the reel assembly. It is also within the scope of the invention to attain a cutting action without the presence of cutting bar 50, if desirable.

The cutting bar 50 includes offset portions 52 which are carried on a movable plate 54, as best shown in FIG. 2. A pair of threaded members 58 is positioned in respective elongated slots 56 formed in the plate. By loosening the bolts, the plate may be adjusted in a vertical direction to vary the height of the bar 50 relative to the apparatus 2 and, hence, the depth of the cut of the apparatus 2 of the invention. The lines of the invention can effectively shear grass, such as shown in FIG. 4, without the requirement of a sharpened edge on the cutting bar 50. As seen in FIG. 5, the skewed relationship of the mono-filament lines to the bar 50 results in progressive contact between each line and the bar during cutting. As shown in FIG. 4, the bar 50 also provides a support function during contact of the mono-filament lines along the bar 50 to insure that the height of the cut grass is even. This is an important feature, because the lines 46 generally exhibit an outward bowed configuration away from their retained ends during rotation and frequently create undulations along their length dependent on such factors as the speed of rotation, line material, length and the like. The bar 50 functions to establish a level contact surface for attaining a constant cutting height regardless of distortion of the lines and an even shearing action without sculpturing and unevenness of the cut. It is within the scope of the invention, however, to orient the lines up to a near parallel relationship with the cutting bar.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lawnmower apparatus comprising
frame means, shaft means rotatably supported on said frame means about an axis;
support means affixed to said shaft means for rotation about said axis.,
a plurality of plastic mono-filament lines carried by said support means, the longitudinal axis of said lines being spaced from said axis,
means for causing rotation of said support means to cause said elongated lines to orbit about said axis of said shaft means;
a cutting bar supported on said frame means in generally parallel relationship to said axis and arranged to contact a respective one of said lines during rotation of said shaft means;
the longitudinal axis of said lines lying in a skewed relationship to said cutting bar for creating progressive contact of portions of respective ones of said lines along the length of said cutting bar to create a shearing cutting action during rotation of said support means; and
said cutting bar further acting as a support during contact with said lines for generally precluding the effect of distortion of said lines during orbiting.

2. The apparatus according to claim 1 wherein said axis of said shaft means is generally horizontal.

3. The apparatus according to claim 1 wherein said support means includes two spaced members having a generally circular periphery, said spaced members having means to retain said lines on said periphery, and said lines extending between said spaced members on said periphery for movement about said axis during rotation of said shaft means.

4. The apparatus according to claim 3 wherein said support means includes resilient means for resiliently retaining at least one end of said lines to said support means, said resilient means providing a resilient attachment of said lines to inhibit breakage.

5. The apparatus according to claim 4 wherein said resilient means includes a support member resiliently carried by said shaft means along said axis, said at least one end of said lines being attached to said resilient means.

6. The apparatus according to claim 5 wherein said resilient means is resiliently carried on said shaft means between said spaced members, said plurality of lines extending through one of said spaced members and beng respectively affixed at opposite ends to the other of said spaced members and to said support member.

7. In a lawnmower apparatus comprising
a reel assembly having a plurality of cutting elements and being rotatably mounted about an axis parallel to the surface upon which the apparatus is being operated;
said plurality of cutting elements being a plurality of elongated mono-filaments affixed to the reel assembly, said mono-filaments having a cutting length disposed in spaced relation to said axis;
said cutting length of said plurality of monofilaments is arranged to orbit about said axis during rotation of said reel assembly;
a cutting bar mounted beneath said reel assembly and having a surface portion cooperating with said plurality of mono-filaments during movement thereof for creating a cutting action;
said plurality of mono-filaments are arranged to contact said surface portion of said cutting bar in a skewed relation for creating progressive contact of respective ones of said mono-filaments on said surface portion along said cutting bar, said cutting bar further supporting said mono-filaments during contact for precluding the effect of distortion during orbiting.

8. In the apparatus according to claim 7 further including means for resiliently attaching one end portion of said one or more said filaments to said reel assembly.

9. In the apparatus of claim 7 wherein said surface portion of said cutting bar extends substantially the length of said cutting length of said plurality of mono-filaments, said cutting length contacting said surface portion in a progressive manner during rotation of said reel assembly.

10. In the apparatus of claim 7 wherein said surface portion of said cutting bar is generally curved without a sharpened edge.

11. A lawnmower apparatus comprising
frame means being carried by wheel means for movement on a support surface;
a shaft being rotatably mounted on said frame means;
at least two support members being carried at spaced positions on said shaft for rotation therewith;
a plurality of mono-filaments being stretched between said support members of rmovement around said shaft;
a cutting bar having a continuous outer surface and being carried in approximate parallel relationship to said shaft beneath said plurality of mono-filaments;
attachment means operatively coupled to said support members and resiliently retaining one end portion of each of said plurality of mono-filaments, said resilient retention creating a resilient tensioning of said mono-filaments for protection against breakage during movement;
said mono-filaments extending along an axis lying in skewed relationship to said cutting bar; and
means for causing rotation of said shaft to cause said mono-filaments to orbit about the axis of said shaft and progressively contact said cutting bar along its length.

* * * * *

UNITED STATES PATENT AND TRADEMARK OFFICE
CERTIFICATE OF CORRECTION

PATENT NO. : 4,653,255

DATED : March 31, 1987

INVENTOR(S) : John D. O'Brien & Stephen M. Baker

It is certified that error appears in the above-identified patent and that said Letters Patent is hereby corrected as shown below:

Title page, under "Inventors", delete "Douglas G. Davidson, Chicago, both of".

Title page, under "Filed", delete "(Under 37 CFR 1.47)".

Signed and Sealed this

Seventh Day of June, 1988

Attest:

DONALD J. QUIGG

*Attesting Officer*  *Commissioner of Patents and Trademarks*